United States Patent

[11] 3,617,592

| [72] | Inventors | Frank C. Arrance<br>Costa Mesa;<br>Carl Berger, Santa Ana, both of Calif. |
|---|---|---|
| [21] | Appl. No. | 539,555 |
| [22] | Filed | Apr. 1, 1966 |
| [45] | Patented | Nov. 2, 1971 |
| [73] | Assignee | McDonnell Douglas Corporation<br>Santa Monica, Calif. |

[54] PROCESS OF FORMING A SINTERED ZINC ELECTRODE
4 Claims, 2 Drawing Figs.

[52] U.S. Cl. .................................................. 264/61,
106/39, 136/30, 136/120, 264/56
[51] Int. Cl. .................................................. C04b33/34,
C04b 35/64
[50] Field of Search .................................. 264/56, 61,
66; 106/39, 55; 136/120 X, 30 X, 31; 23/147

[56] References Cited
UNITED STATES PATENTS

| 2,640,864 | 6/1953 | Fischbach .................. | 136/30 |
| 2,865,974 | 12/1958 | Scheuerle et al. ............ | 136/30 |
| 2,931,846 | 4/1960 | Cunningham et al. ........ | 136/31 |
| 2,987,567 | 6/1961 | Freas et al. ................. | 136/30 |
| 3,053,924 | 9/1962 | Strauss et al. ................ | 136/30 |
| 3,287,164 | 11/1966 | Arrance et al. ............... | 136/20 |

Primary Examiner—Donald J. Arnold
Attorney—Max Geldin

ABSTRACT: Production of a zinc electrode of improved strength and electrical conductivity, produced by compacting a mixture of calcined zinc oxide and zinc oxide, e.g. about 75 percent of the former and about 25 percent of the latter, sintering such compacted mixture at temperatures in excess of about 600° C. generally about 600° to about 1,450° C., and forming a strong ceramiclike zinc electrode.

PATENTED NOV 2 1971 3,617,592
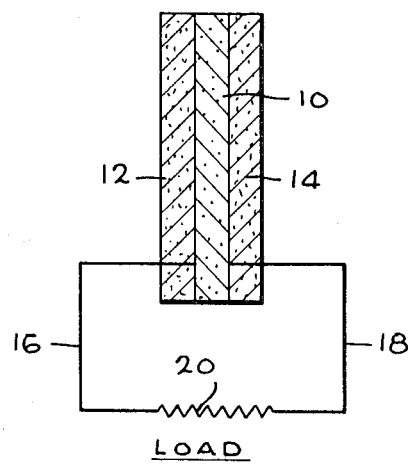
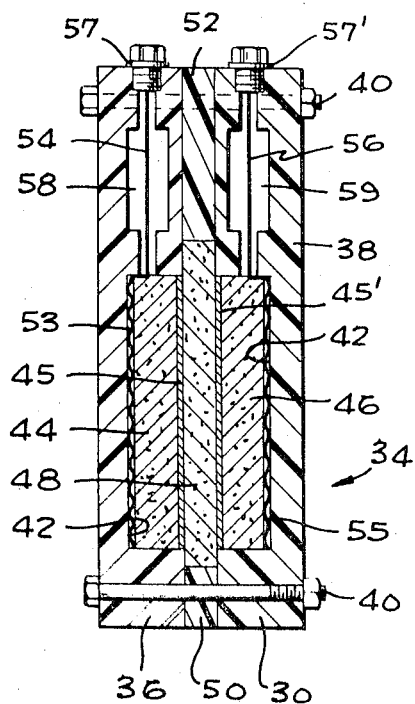
FRANK C. ARRANCE
CARL BERGER
INVENTORS
BY Max Geldin
ATTORNEY

PROCESS OF FORMING A SINTERED ZINC ELECTRODE

This invention relates to batteries, particularly high energy density batteries, and is especially concerned with the provision of an improved zinc electrode structure for use in batteries, to improved battery construction embodying such electrode, and to procedure for producing such electrode.

Batteries are an important source of energy storage for power generation in airborne systems. An important type of battery particularly suited for such applications are the high energy density alkaline electrolyte cells such as the silver-zinc battery. High energy density batteries are generally battery systems which have a substantially higher energy per unit of weight than conventional, e.g., lead storage batteries. Thus, high energy density batteries can develop, e.g., 100 to 140 watt hours of energy per pound. In addition to important airborne applications, such high energy density batteries have many other applications such as in portable tools and appliances, television, radio and record players, engine starting, portable X-ray units and the like.

In high energy density batteries such as silver-zinc batteries, the electrodes are placed adjacent opposite sides of a membrane or separator which performs the function of retaining electrolyte, separating the electrodes, and preventing migration of electrode ions which short circuit the battery. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperatures.

Zinc electrodes used in silver-zinc batteries are conventionally made by pasting zinc oxide to a metal screen or by compressing zinc oxide powder into a compact form or pellet. However, the physical integrity of such zinc electrodes used in silver-zinc batteries is difficult to maintain at room temperature and is particularly difficult to maintain at temperatures of the order of 100° C. and above. Such zinc electrodes have relatively short life due to slumping of the paste mixture, electrochemical changes during charging and discharging, and are not in the form of a strong disc or shape having a set geometrical physical form and structure. Thus, for example, even when such zinc electrode is placed directly in contact with the battery separator, slumping and segregation of the electrode material toward the bottom of the electrode compartment occurs, making it difficult to maintain good uniform contact between the zinc electrode and the separator, and also between the zinc electrode and the electrode collector screen, and causing changes in electrode characteristics.

Accordingly, an important area of further development and improvement in connection with the production and use of high energy density silver-zinc batteries, has resided in the improvement in the construction of zinc electrodes, to provide a strong, durable zinc electrode having a set geometrical shape and form, and which when incorporated in a silver-zinc battery, provides a more efficient and durable battery.

According to the invention, it has now been found that a zinc electrode having materially improved strength and durability characteristics when incorporated in a high energy density silver-zinc battery, can be produced by compacting zinc oxide into the desired shape and sintering such compacted zinc oxide body, generally at temperatures in excess of about 600° C., to form a strong, ceramiclike product which has excellent electrical conductivity and which can be electrically changed or electroformed readily to convert the zinc oxide to zinc metal, and forming a highly active zinc electrode. In preferred practice, and for reasons pointed out in detail hereinafter, a compacted mixture of calcined or presintered zinc oxide and zinc oxide powder (which has not been previously heat treated) is subjected to sintering to form the final zinc oxide bodies or electrodes of the invention.

Thus, in producing the improved zinc electrode hereof, there can be employed as starting material either zinc oxide alone, or preferably a mixture of calcined zinc oxide and zinc oxide. The employment of a starting material in the form of a mixture including the calcined zinc oxide, reduces the amount of shrinkage obtained in the sintering operation and in addition the presence of calcined zinc oxide in the zinc oxide starting material results in a sintered zinc oxide body which has outstanding electrical conductivity. Moreover, by employment of a mixture of calcined and uncalcined or raw zinc oxide, a fusion of these two materials occurs during the sintering operation, resulting in a stronger zinc oxide matrix as the final product.

Where, according to preferred practice, a mixture of calcined zinc oxide and zinc oxide is employed, the relative proportions of calcined zinc oxide and of zinc oxide can be widely varied. Thus, for example, minor proportions of calcined zinc oxide, e.g., less than 10 percent by weight of the mixture, or very large proportions of such calcined material, e.g., above 90 percent by weight of the mixture can be employed. It is preferred not to employ as starting material entirely calcined zinc oxide due to inferior bonding of this material during the subsequent sintering operation. Although zinc oxide alone can be employed as starting material, it is not preferred due to the large shrinkage of this material during the sintering operation. It has been found that best results are obtained when a mixture of between about 50 percent and about 90 percent of calcined zinc oxide, and about 50 percent to about 10 percent of zinc oxide, by weight is employed, and in preferred practice such mixture contains a major proportion of calcined zinc oxide. Thus, for example, a mixture of about 75 percent calcined zinc oxide and about 25 percent zinc oxide has been found highly satisfactory.

Where according to preferred practice calcined zinc oxide is employed in the raw material to be subsequently sintered according to the invention procedure, such calcined zinc oxide is prepared by heating zinc oxide at temperature generally ranging from about 600° to about 1,800° C., usually from about 1,000° to about 1,400° C., the time of treatment generally ranging from about one-half hour up to about 6 hours depending on the particular calcining temperature employed. Thus, for example, at temperature of about 1,200° C. calcining treatment may be carried out for a period of about 1 hour.

The starting material, preferably a mixture of calcined zinc oxide and zinc oxide powder, as noted above, is compacted into the desired shape, e.g., in a die. If desired, however, prior to compaction, the starting material can be mixed with small amounts of binders and lubricants to maintain the compacted zinc oxide material in the desired shape during drying prior to sintering, and to permit application of equalized compaction pressure throughout the zinc oxide mass. Compaction of the starting material can be carried out, for example, at pressures ranging from about 2,000 to about 10,000 p.s.i.

The compacted shaped zinc oxide body is generally dried at elevated temperature for a period of time to remove all moisture, such drying taking place at temperatures which can range from about 100° to about 350° C.

The compacted and preferably dry zinc oxide body formed in the desired shape, is then sintered by heating or firing at temperatures in excess of about 600° C., and generally ranging from about 600° to about 1,450° C., usually about 700° to about 1,200° C. Such sintering is generally carried out for a period of from about 15 minutes up to about 2 hours, depending upon the particular sintering temperature. During the sintering operation, a bonding together of the zinc oxide particles occurs which results in formation of a hard ceramiclike sintered body or electrode. The sintering temperature is generally, although not necessarily, lower than the above noted calcining temperature of the zinc oxide, in order to obtain the desired bonding action between the calcined and raw zinc oxide during the sintering operation.

The sintered zinc oxide body or electrode thus formed has a very high transverse strength, of the order of about 8,000 to about 10,000 p.s.i., or greater, and of further significance, the electrical conductivity of such sintered zinc oxide body or electrode is unusally high, approaching the electrical conductivity of zinc metal itself. The amount of shrinkage which occurs during sintering depends upon the proportion of calcined zinc oxide which is present in the zinc oxide starting material. By increasing the proportion of such calcined zinc oxide in the starting material, the percentage of shrinkage which occurs during the subsequent sintering operation is reduced. Hence, as previously noted, in order to control the amount of shrinkage and maintain such shrinkage relatively small, e.g., of the order of about 5 percent to about 10 percent, a relatively large proportion of calcined zinc oxide preferably is employed in the starting material, but preferably sufficient raw or uncalcined zinc oxide is employed in such mixture, e.g., at least about 10 percent, to provide the necessary bonding of the calcined and uncalcined particles of zinc oxide.

The strong sintered zinc bodies or electrodes thus produced are of ceramiclike character, but can be either porous or nonporous. However, for producing improved zinc electrodes according to the invention, it is preferred that the sintered zinc oxide body or electrode formed according to the invention procedure be of a porous nature. The porosity of the sintered zinc oxide bodies or electrodes produced according to the invention can be controlled by adjusting the ratio of raw zinc oxide to calcined zinc oxide in the starting material, varying compaction pressure, sintering temperature and time, or by adding burn-out materials. Preferably, the zinc oxide electrodes of the invention have a porosity ranging from about 15 to about 60 percent.

The sintered zinc oxide electrodes produced according to the invention are first electrically converted or electroformed to convert the zinc oxide to zinc for use as an active zinc electrode, e.g., in a silver-zinc battery. Such electroforming operation can be carried out by charging the electrode externally of a cell, using an alkali, e.g., potassium hydroxide, as electrolyte, or the zinc oxide electrode of the invention can be assembled in a silver-zinc battery with, for example, KOH as electrolyte, and the battery first charged to convert the zinc oxide to an active zinc metal electrode.

The invention will be further described in relation to the accompanying drawing wherein:

FIG. 1 is a schematic representation of a battery assembly including a zinc electrode according to the invention, in conjunction with a silver electrode and a separator, and FIG. 2 shows the manner of assembly of battery components, including a zinc electrode according to the invention, to form an improved efficient and durable battery according to the invention.

The illustrations of the drawing are exaggerated for purposes of greater clarity.

Referring to FIG. 1 of the drawing, numeral 10 represents a porous separator, e.g., a microporous inorganic separator as described more fully below, numeral 12 represents a zinc electrode produced according to the invention process, and numeral 14 is a conventional silver electrode. The electrodes 12 and 14 can be pressed or otherwise placed in engagement with the opposite faces of the separator 10. The separator 10 and/or the electrodes 12 and 14 are treated or soaked with an alkaline electrolyte. Wires 16 and 18 connect the electrodes 12 and 14, respectively, to a load 20.

During charging of the battery illustrated in FIG. 1, the silver is oxidized to silver oxide and the zinc oxide electrode is reduced to zinc as pointed out above, and during discharge of such battery, the silver oxide is converted to silver and the zinc is converted to zinc oxide. Because of these reversible reactions, the terms "silver" and "zinc," referring to the respective electrodes of a silver-zinc battery system, are intended to denote either the respective metals themselves or the corresponding oxides thereof.

Inorganic separator materials which can be used to form the preferred inorganic separator, e.g., member 10 in FIG. 1 above, can include a variety of inorganic substances. Thus, for example, suitable inorganic separator materials include insoluble hydrous metal oxides such as the hydrous oxides of zirconium, titanium, antimony, tungsten, silicon, scandium, bismuth, vanadium, aluminum and cerium. Such hydrous metal oxide separator materials and their method of preparation are described in the copending application Ser. No. 379,093 filed June 30, 1964 of Carl Berger et al. A preferred separator of this type is hydrous zirconium oxide or zirconia.

Other porous inorganic materials which can be employed for producing the separator include the aluminosilicates, particularly the alkali metal and alkaline earth metal aluminosilicates, particularly because of their formation of a hard ceramic material upon sintering, while still retaining suitable porous characteristics. The aluminosilicates are particularly preferred in this respect because such aluminosilicates have lower internal resistance as compared, for example, to alumina or silica. Examples of such aluminosilicates include aluminosilicate, sodium and potassium aluminosilicates, and magnesium, calcium, barium and strontium aluminosilicates. These materials can be used separately, but often mixtures of these aluminosilicates are used, e.g., complex mixtures of both the alkali metal and alkaline earth metal aluminosilicates. These separators are produced by compressing and bonding particles or granules of the above inorganic materials, e.g., aluminosilicates, and preferably sintering to form a rigid membrane. Another useful class of inorganic separator materials are the naturally occurring clay minerals of the kaolinite group, and the mineral clays halloysite, dickite, nacrite and anauxite. Such inorganic separator materials and production of these inorganic separators are described in the copending U.S. applications Ser. No. 378,858, filed June 29, 1964, and Ser. No. 499,294, filed Oct. 21, 1965, both by Carl Berger et al.

Organic separators which can be employed to produce batteries incorporating the zinc electrode principles hereof include, for example, microporous plastics such as nylon, Dynel (vinyl chloride-acrylonitrile copolymer), Teflon (poly-tetrafluoroethylene), sausage casing (felted regenerated cellulose), and the like.

If desired, however, other types of inorganic or organic separators can be employed.

As previously noted, the separator functions to retain electrolyte, to separate the electrodes, and also to permit transfer of electrolyte ions but prevent transfer of electrode ions.

The following are examples of practice of the invention:

EXAMPLE 1

Silver electrode material is prepared using equal parts of silver and silver oxide. These materials are mixed in a high-speed vibrating mixer and the resulting mixture placed in a die and compressed at 5,000 p.s.i. pressure to form a silver electrode.

Zinc oxide powder is calcined by heating such zinc oxide at a temperature of 1,200° C. for a period of about 1 hour.

A mixture of 73 percent of the above calcined zinc oxide, 25 percent raw or unclacined zinc oxide, 1 percent dextrin, and 1 percent zinc stearate is formed. The dextrin is employed as a binder and the zinc stearate as a lubricant. The resulting material is thoroughly mixed, placed in a die and compressed at 15 tons pressure (8,000 p.s.i.) to form a zinc electrode shape.

Such compressed body is then dried for a period of about 12 hours at 300° C. The dried zinc electrode shape is then sintered at 1,000° C. for a period of about one-half hour. The resulting zinc oxide electrode has a porosity of about 20 percent and high transverse strength of about 10,000 p.s.i.

An inorganic separator is provided by compacting and sintering a mixture of alkali metal and alkaline earth metal aluminosilicates, as described in above copending application Ser. No. 499,294, now U.S. Pat. No. 3,379,570, such separator having a porosity of about 12 percent.

The separator and electrodes described above are assembled to form a battery as shown in FIG. 2, employing a plastic case 34 formed of two symmetrical, e.g., Teflon, half portions 36 and 38 which are bolted together as indicated at 40. Compartments 36 and 38 of the case have recesses 42 formed therein which receive the zinc oxide electrode 44 prepared as described above, and the silver electrode 46, prepared as described above. An inorganic sintered aluminosilicate separator 48 prepared as described above is disposed centrally between the case portions 36 and 38 so that the electrodes 44 and 46 are pressed against opposite surfaces of such separator, which has a potassium titanate paper 45 inserted between the zinc oxide electrode 44 and separator 48, and a potassium titanate paper 45' placed between the silver electrode 46 and separator 48. If desired, however, such potassium titanate papers can be omitted. Teflon spacers 50 and 52 are provided about the periphery of separator 48, to form a leakproof seal. Nickel screen 53 and 55 are pressed against electrodes 44 and 46 adjacent to the bottom of the compartment recesses 42, and silver terminal wires 54 and 56 are connected respectively to the screens 53 and 55, and are brought through the plastic electrode sections at the top of the assembly and connected to terminals 57 and 57', as shown. Small electrolyte reservoirs 58 and 59 are provided in the upper portion of the respective electrode compartments 36 and 38.

Following assembly of the battery as described above, 45 percent potassium hydroxide solution is then introduced into the battery and the battery is charged at room temperature at a constant current density of 100 ma./cm.$^2$. During such charging the zinc oxide electrode is converted to zinc and the silver present in the silver electrode is converted to silver oxide.

This is followed by a room temperature discharge for ½ hour at a constant current density of 200 ma./cm.$^2$, followed by charging again at room temperature at a constant current density of 120 ma./cm.$^2$ for 1 hour. Such ½ hour discharge—1 hour charge cycles are continued for 750 cycles with the battery having a voltage plateau of about 1.45 volts during the discharge portions of the cycle and with a depth of discharge of about 20 percent.

EXAMPLE 2

The procedure of example 1 is essentially repeated, except that the starting material for the zinc oxide electrode is composed of 75 percent of the calcined zinc oxide produced as described in example 1, and 25 percent raw zinc oxide, and the compacted mixture is sintered at 850° C. for about 2 hours.

A strong dense ceramiclike mass or matrix is produced. Such sintered electrode is essentially nonporous, has excellent electrical conductivity of about 60 ohms per linear inch for a ¼-inch thick plate, and is readily electrically changed or electroformed to convert the zinc oxide to zinc metal.

A silver-zinc battery of the type described in example 1 and illustrated in FIG. 2, and incorporating the above noted sintered zinc oxide electrode, following initial electroforming of the zinc oxide electrode, is operated for 650 ½-hour discharge, ½ hour charge cycles at 25° C. at constant current density of 20 ma./cm.$^2$ and at 20 percent depth of discharge.

EXAMPLE 3

The procedure of example 1 is repeated, except that all of the zinc oxide material in the starting mixture is unsintered or raw zinc oxide.

During sintering of the resulting compacted starting material, substantial shrinkage occurs, and the resulting zinc oxide electrode, although performing over a number of discharge-charge cycles when incorporated in a silver-zinc battery as described in example 1 and illustrated in FIG. 2 at room temperature, has substantially lower strength than the sintered zinc oxide electrode of example 1.

EXAMPLE 4

The procedure of example 1 is repeated, except employing as the starting material a mixture of 25 percent calcined zinc oxide as produced in example 1, and 75 percent raw or uncalcined zinc oxide. The resulting mixture is compacted and sintered as described in example 1.

The resulting sintered zinc oxide electrode has a porosity of about 25 percent and is very strong, having a transverse strength of about 10,000 p.s.i.

Such sintered zinc oxide electrode, following electroforming and incorporation in a silver-zinc battery as described in example 1 and illustrated in FIG. 2, operates efficiently over a large number of discharge-charge cycles at both ambient temperature and elevated temperature of about 100° C.

EXAMPLE 5

A silver-zinc battery as described in example 1 and illustrated in FIG. 2, and containing the sintered zinc oxide electrode produced as described in example 1, is subjected to discharging and charging at 100° C. Such battery operates for 485 cycles satisfactorily at 100° C., each of such cycles comprising a ½ hour discharge at a current density of 200 ma./cm.$^2$ and a ½ hour charge at 220 ma./cm.$^2$, with a voltage plateau during the discharge cycles of 1.45 volts and a 20 percent depth of discharge.

When the sintered zinc oxide bodies produced according to the invention are electroformed and converted into zinc metal, as previously noted, the resulting electrode is extremely active. When exposed to air, the zinc oxidizes rapidly producing a relatively large amount of heat. Due to such high degree of activity, the sintered zinc oxide bodies of the invention when electroformed or converted to zinc have utility as catalysts for reactions such as the oxidation of hydrocarbons.

From the foregoing, it is seen that the invention provides procedure for preparation of high strength durable zinc electrodes of any desired shape and which maintain such shape without disintegration when such electrode is incorporated into a battery such as a silver-zinc battery, and the battery is operated over a large number of charge-discharge cycles. In addition to producing zinc electrodes or zinc oxide bodies of high strength, such zinc oxide electrodes have high electrical conductivity and hence can be readily charged following a discharge cycle. Further, the sintering operation for producing such electrodes can be controlled to minimize shrinkage, and the procedure can also be controlled to obtain ceramiclike sintered zinc oxide bodies or electrodes of controlled density or porosity.

While we have described particular embodiments of our invention for purposes of illustration, it will be understood that the invention is not to be taken as limited except by the scope of the appended claims.

We claim:

1. The process which comprises compacting a mixture of about 50 percent to about 90 percent calcined zinc oxide and about 50 percent to about 10 percent zinc oxide into a desired shape, sintering said compacted mixture at temperatures of about 600° to about 1,450° C. for a period of time sufficient to effect said sintering, and forming a strong ceramiclike zinc electrode.

2. The process as defined in claim 1, including the step of first forming said calcined zinc oxide by heating zinc oxide at temperature of about 600° to about 1,800° C.

3. The process as defined in claim 1, wherein said compacted mixture is sintered at temperature ranging from about 700° to about 1,200° C.

4. The process as defined in claim 1 which comprises calcining zinc oxide at temperature from about 1,000° to about 1,400° C., forming a mixture of about 75 percent of said calcined zinc oxide and about 25 percent of zinc oxide, by weight, compacting said mixture into a desired electrode shape, sintering said compacted mixture at temperature of about 700° to about 1,200° C. for a period of from about 15 minutes up to about 2 hours, and forming a strong ceramiclike zinc electrode.

* * * * *